United States Patent [19]

Burgum

[11] Patent Number: 5,273,767
[45] Date of Patent: Dec. 28, 1993

[54] RAPIDLY HYDRATING GUMS

[75] Inventor: Dan R. Burgum, San Diego, Calif.

[73] Assignee: Merck & Co., Inc., Rahway, N.J.

[21] Appl. No.: 942,249

[22] Filed: Sep. 9, 1992

[51] Int. Cl.$^5$ ................................................. A23L 1/00
[52] U.S. Cl. ..................................... 426/240; 426/573
[58] Field of Search ......................... 426/240, 237, 573

[56] References Cited

U.S. PATENT DOCUMENTS 3,573,067  3/1971  Shults ................................. 426/240

FOREIGN PATENT DOCUMENTS 561924  8/1958  Canada ................................ 426/240

OTHER PUBLICATIONS

Dialog Data Base, File 351: Derwent World Patents Index, Dialog Acc. No. 009157015, Abstracting WO 9212789 Aug. 6, 1992.

Graham, Food Colloids published by the AVI Publishing Co., Inc. 1977 (pp. 514–517 and 531–533).
Furia, CRC Handbook of Food Additives, Second Edition, vol. I, 1972 (pp. 319, 320 and 325).
Food Hydrocolloids, vol. 5, No. ½ pp. 155–157, 1991.
Journal of Applied Polymer Science, vol. 38, 191–1928 (1989).

*Primary Examiner*—George Yeung
*Attorney, Agent, or Firm*—Richard S. Parr; Melvin Winokur

[57] ABSTRACT

Modified, rapidly hydrating xanthan gum and guar gum and a process for preparation of rapidly hydrating xanthan gum and guar gum which comprises irradiating non-irradiated xanthan gum or guar gum with ionizing radiation. Also, a process for sterilizing food products containing xanthan gum or guar gum as a gelling hydrocolloid which comprises irradiating the food product with ionizing radiation.

12 Claims, No Drawings

RAPIDLY HYDRATING GUMS

BACKGROUND OF THE INVENTION

This invention relates to a rapidly hydrating xanthan gum and rapidly hydrating guar gum, and processes for their preparation. This invention also relates to a process for sterilizing food products containing xanthan gum or guar gum as a thickening hydrocolloid. Other aspects of the disclosed invention as well as its advantages will be apparent to those ordinarily skilled in the art upon reading the following disclosure and claims.

Hydrophilic polymers or gums are widely used in industry. They are used commercially to thicken, suspend or stabilize aqueous systems. They are also used to produce gels or act as emulsion stabilizers, flocculants, binders, film formers, lubricants and friction reducers. In other words, they act to adjust and control the rheological properties of the aqueous systems to which they are added.

One of the most widely used gums in industry is xanthan gum. Xanthan gum is an extracellularly produced gum made by the heteropolysaccharide-producing bacterium *Xanthomonas campestris* by whole culture fermentation of a medium comprising a fermentable carbohydrate, a nitrogen source and other appropriate nutrients. Examples of commercially available xanthan gum are KELTROL T, KELTROL F, KELZAN AR and KELZAN, available from Kelco Division of Merck & Co., Inc. Processes for producing xanthan gum are described in a number of patents, including U.S. Pat. Nos. 4,316,012, 4,352,882 and 4,375,512.

Previous methods employed to improve the hydration rate of xanthan gum, freeze drying and agglomeration, gave only a slight increase in hydration rate and resulted in a diluted sample. It has now been found that by treating the xanthan gum powder with ionizing radiation, one can increase the hydration rate of xanthan gum by as much as 90%. This allows for faster solution preparation times, i.e., faster addition of dry polymer to aqueous systems, thereby increasing productivity. Productivity is increased because shorter mixing times are needed to achieve 100% hydration. The present invention on the other hand is a one step process yielding a 100% gum product with a hydration rate that is up to 90% greater than that of an untreated gum.

Treatment of polymers such as arabinoxylan and karaya gum with ionizing radiation (e.g., gamma irradiation) is disclosed in the prior art. However, these publications do not teach or suggest treatment of xanthan gum with ionizing radiation to increase the hydration rate. Nor do they teach or suggest sterilization of food products containing xanthan gum therein. *The Journal of Applied Polymer Science*, vol. 38, 1919-1928 (1989), discloses only that the effect of gamma irradiation on a water-insoluble arabinoxylan is to modify both sugar components of the arabinoxylan, thus increasing the molecular and chemical heterogeneity of the polysaccharide. It has also been shown that the microbiological contamination of Karaya gum from *Sterculia urens* and *S. setigera*, resulting in part from the mode of storage and handling, can be greatly reduced by radiosterilization of powered samples. *Food Hydrocolloids*, vol. 5 no. 1/2, 155-157 (1991).

SUMMARY OF THE INVENTION

The invention is a modified, rapidly hydrating xanthan gum, a process for its production and a process for sterilizing food products comprising xanthan gum. The modified, rapidly hydrating xanthan gum of the present invention is prepared by irradiation using ionizing radiation. Irradiation can be by one of several means, including gamma irradiation or a high energy electron beam. The amount of radiation used to produce the modified, rapidly hydrating xanthan gum is between about 0.1 and 4.5 Mrad.

The invention is also a modified, rapidly hydrating guar gum, a process for its production and a process for sterilizing food products comprising guar gum. The modified, rapidly hydrating guar gum of the present invention is prepared by irradiation using ionizing radiation. Irradiation can be by one of several means, including gamma irradiation or a high energy electron beam. The amount of radiation used to produce the modified, rapidly hydrating guar gum is between about 0.1 and 4.5 Mrad.

Sterilized food products comprising xanthan gum are prepared by irradiating the food product with ionizing radiation in an amount between about 0.2 and 1.0 Mrad. Sterilized food products comprising guar gum are also prepared by irradiating the food product with ionizing radiation in an amount between about 0.2 and 1.0 Mrad.

DETAILED DESCRIPTION OF THE INVENTION

The present invention discloses a modified, rapidly hydrating xanthan gum and a process for its preparation. It is produced by irradiating non-irradiated xanthan gum with a source of ionizing radiation, preferably gamma rays emitted by Cobalt 60 or a high energy electron beam around 12 MeV.

The present invention also discloses a modified, rapidly hydrating guar gum and a process for its preparation. It is produced by irradiating non-irradiated guar gum with a source of ionizing radiation, preferably gamma rays emitted by Cobalt 60 or a high energy electron beam around 12 MeV.

Xanthan gum which is irradiated to produce the modified xanthan gum of the present invention is an extracellularly produced gum made by the heteropolysaccharide-producing bacterium *Xanthomonas campestris* by whole culture fermentation of medium comprising a fermentable carbohydrate, a nitrogen source and other appropriate nutrients. Examples of commercially available xanthan gum are KELTROL® T, LKELTROL® F, KETROL® AR and KELZAN®, available from Kelco Division of Merck & Co., Inc. Processes for producing xanthan gum are described in a number of patents including U.S. Pat. Nos. 4,316,012, 4,352,882 and 4,375,512.

Guar gum is a commercially available gum. For example, Guar Supercol U Fine is available from Aqualon.

Gellan gum, which was also irradiated and compared to the irradiated xanthan gum and irradiated guar gum of the present invention, is a heteropolysaccharide prepared by fermentation of *Pseudomonas elodea* ATCC 31461. An example of commercially available gellan gum is KELCOGEL®, available from Kelco Division of Merck & Co., Inc. Processes for preparing gellan gum include those described in U.S. Pat. Nos. 4,326,052 and 4,326,053. KELCOLOID HVF (propylene glycol alginate, available from Kelco Division of Merck & Co., Inc.), KELTONE HV (sodium alginate, available from Kelco Division of Merck & Co., Inc.), CMC 7HF (Aqualon), Pectin Genu DD Slow Set (Aqualon), and Carrageenan Gelcarin GP 812 (Marine Colloids/FMC) were also irradiated and compared to the modified, rapidly hydrating xanthan gum and modified rapidly hydrating guar gum of the present invention.

The amount of radiation or dose required to prepare the modified xanthan gum or modified guar gum is at least 0.1 Mrad, preferably between about 0.1 and 4.5 Mrad, and even more preferably between about 0.5 and 2.0 Mrad. The radiation processing can be carried out using typical commercial radiation plant technology or facilities (e.g., Isomedix Operations Inc., Whippany N.J., and Isotron PLC in Swindon U.K. for irradiation using Cobalt 60, and IRT Corp. in San Diego, Calif. for irradiation using high energy electron beams). Standard irradiation procedures, described in the Examples section, would be apparent to those skilled in the art.

This invention further encompasses a process for sterilizing food products containing xanthan gum and/or guar gum as a gelling hydrocolloid. This process comprises irradiating the food product with a source of ionizing radiation, preferably gamma rays emitted by Cobalt 60 or a high energy electron beam around 12 MeV.

The dose required in the food sterilization application is between about 0.2 and 1.0 Mrad, preferably between about 0.5 and 1.0 Mrad.

The modified xanthan gum is suitable for use in many of the same applications in which unmodified xanthan gum is used. Modified guar gum is also suitable for use in many of the same applications in which unmodified guar gum is used.

For example, the major food applications of xanthan gum include, but are not limited to, use in dressings (high, low and no oil), relishes and sauces, syrups and toppings, starch based products (canned desserts, fillings, retort pouches), dry mix products (desserts, gravies, beverages, sauces, dressings), farinaceous foods (cakes), dairy products (ice cream, shakes, processed cheese spread, cottage cheese), and confectionary.

Major industrial applications include, but are not limited to, use in flowable pesticides, liquid feed supplements, cleaners, abrasives, polishers, metal working, ceramics, foundry coatings, texturized coatings, slurry explosives, dye and pigment suspensions, cosmetics, creams, lotions and pharmaceuticals. Xanthan gum also has a variety of uses in the oil field industry. These include, but are not limited to, use in drilling fluids (muds), workover and completion fluids, stimulation and enhanced oil recovery.

EXAMPLES

The following procedures were followed to prepare modified xanthan gum and modified guar gum of the present invention:

SAMPLE PREPARATION

Gamma Radiation Treatment

The following polysaccharides were irradiated with gamma radiation to determine the effect on various polysaccharide properties: KELTROL T, KELTONE HV, KELCOLOID HVF, KELCOGEL (all commercially available from Kelco, a Division of Merck & Co., Inc. (San Diego)), CMC 7HF (Aqualon), Guar Supercol U Fine (Aqualon), Pectin Genu DD Slow Set (Aqualon), and Carrageenan Gelcarin GP 812 (Marine Colloids/FMC).

Forty grams of each gum were places into four 5 1"×6" heat sealable pouches commonly used for gamma radiation sterilization (Kenpack, Inc., City of Commerce, Calif.). Each pouch was heat sealed and examined for leakage. Three sets were irradiated using Cobalt 60. The first set was exposed to 0.5 Mrad, the second to 1.0 Mrad, and the third to 2.0 Mrad of irradiation. The fourth set was stored and used as a control.

High Energy Electron Beam

Three sets of pouches containing one of KELTROL T, KELTONE HV, or KELCOGEL (all commercially available from Kelco, a Division of Merck & Co., Inc. (San Diego)) were irradiated using a high energy electron beam @ 12 MeV. The first set was exposed to 0.5 Mrad, the second to 1.0 Mrad, and the third to 2.0 Mrad of irradiation.

HYDRATION RATE TESTING

Hydration rates of KELTROL T, KELCOLOID HVF, KELTONE HV, CMC and guar samples were determined using the Kelco Hydration Rate Tester. The tester was set to 600 rpm and sample, dispersed 1 part sample to 6 parts sugar, was added to 130 ml of deionized water to begin the test. 1% sample was used for all tests unless viscosity was so low that measurements were inconsistent. When viscosity was to low, 1.5% was used.

Hydration rates of KELCOGEL samples were determined using the thermal hydration tester as described in the "Gellan Gum Basic Research Report (Hydration Study)," issued Aug. 26, 1991, which uses a Brookfield LVT viscometer fitted with a UL adapter and a DIN spindle.

TABLE 1

| Radiation Type | Rad Dose | Minutes to 90% Hydration | | | | |
|---|---|---|---|---|---|---|
| | | KELTROL T | KELTONE V | KELCOLOID HVF | CMC | SuperCol U Guar |
| Cobalt | 0 | 2.67 | 1.78 | 0.99 | 1.05 | 24 |
| | 0.5 | 0.49 | 1.81 | 0.84 | 1.38 | 2.57 |
| | 1.0 | 0.48 | 1.55 | 0.96 | 1.37 | 2.05 |
| | 2.0 | 0.25 | 1.50 | 0.93 | 1.46 | 2.1 |
| Electron Beam | 0.5 | 0.93 | 1.45 | — | | |
| | 1.0 | 0.47 | 1.44 | — | | |
| | 2.0 | 0.42 | 1.53 | — | | |

The data show a dramatic distinction between the modified gums of the present invention (modified xanthan gum and modified guar gum) and other commonly used hydrophilic polymers modified by irradiation. None of the other polymers or gums tested became rapidly hydrating hydrophilic polymers.

VISCOSITY TESTING 0.1% KELTROL T viscosities were measured using a Brookfield LVT DVI viscometer fitted with a UL adaptor and spindle. 1.0% guar and CMC samples were measured using the standard protocol listed in the manufacturer's literature. CMC was measured using a Brookfield LVT @ 30 rpm. The guar samples were measured using a Brookfield LVT @ 6 rpm and a Brookfield RVT @ 20 rpm. Other samples were measured using a Brookfield LVT DV III Programmable cone and plate viscometer at shear rates from 0.4 to 500 1/s.

Although irradiation decreased the rheological properties of many of the polysaccharides studied, xanthan gum solution viscosity was least affected.

What is claimed is:

1. A modified, rapidly hydrating xanthan gum, prepared by irradiating non-irradiated xanthan gum with ionizing radiation.

2. A modified xanthan gum of claim 1 prepared by irradiating non-irradiated xanthan gum with gamma irradiation.

3. A modified xanthan gum of claim 1 prepared by irradiating non-irradiated xanthan gum with a high energy electron beam.

4. A modified xanthan gum of claim 1 prepared by irradiating non-irradiated xanthan gum with an amount of radiation of at least about 0.1 Mrad.

5. A modified xanthan gum of claim 1 prepared by irradiating non-irradiated xanthan gum with an amount of radiation of between about 0.1 and 4.5 Mrad.

6. A modified xanthan gum of claim 1 prepared by irradiating non-irradiated xanthan gum with an amount of radiation of between about 0.1 and 2.0 Mrad.

7. A process for preparing a modified, rapidly hydrating xanthan gum, which comprises irradiating non-irradiated xanthan gum with at least about 0.1 Mrad of ionizing radiation.

8. A process of claim 7 wherein the ionizing radiation is between about 0.1 and 4.5 Mrad.

9. A process of claim 8 wherein the ionizing radiation is between about 0.5 and 2.0 Mrad.

10. A process for sterilizing a food product comprising non-irradiated xanthan gum as a gelling hydrocolloid, which comprises irradiating the food product with ionizing radiation of between about 0.2 and 1.0 Mrad.

11. A process of claim 10 which comprises irradiating the food product with gamma irradiation.

12. A process of claim 10 which comprises irradiating the food product with a high energy electron beam.

* * * * *